United States Patent [19]

Akiike

[11] Patent Number: 5,052,189
[45] Date of Patent: Oct. 1, 1991

[54] HEAT PUMP REFRIGERATION SYSTEM FOR A MOTOR VEHICLE

[75] Inventor: Shigeru Akiike, Isesaki, Japan

[73] Assignee: Sanden Corporation, Gunma, Japan

[21] Appl. No.: 539,316

[22] Filed: Jun. 13, 1990

Related U.S. Application Data

[63] Continuation of Ser. No. 264,527, Oct. 31, 1988, abandoned.

[30] Foreign Application Priority Data

Oct. 29, 1987 [JP] Japan .............................. 62-271849
Feb. 29, 1988 [JP] Japan .............................. 63-44498

[51] Int. Cl.⁵ .......................................... F25B 49/02
[52] U.S. Cl. .................................. 62/197; 62/505
[58] Field of Search ................................ 62/197, 505

[56] References Cited

U.S. PATENT DOCUMENTS

| | | | |
|---|---|---|---|
| 359,815 | 1/1975 | Hasahara | 62/197 |
| 2,363,273 | 11/1944 | Waterfall | 62/197 |
| 2,779,162 | 1/1957 | Baker et al. | 62/197 |
| 2,958,209 | 11/1960 | Egan | 62/197 |
| 2,963,878 | 12/1960 | Beggs et al. | 62/197 X |
| 3,006,163 | 10/1961 | Koocker | 62/505 X |
| 3,006,164 | 10/1961 | McMillan | 62/505 X |
| 3,074,249 | 1/1963 | Henderson | 62/197 X |
| 3,564,865 | 2/1971 | Spencer et al. | 62/197 |
| 4,262,492 | 4/1981 | Morita et al. | 62/505 X |

Primary Examiner—William E. Tapoical
Attorney, Agent, or Firm—Banner, Birch, McKie & Beckett

[57] ABSTRACT

A heat pump refrigeration system for refrigerating a compartment includes a first heat exchanger mounted outside the compartment, a second heat exchanger mounted inside the compartment and coupled to the first heat exchanger, and a compressor. A refrigerator conduit is coupled between the first and second heat exchangers, and between the compressor and the first and second heat exchangers, to transport refrigerant. A valve mechanism is coupled between the compressor and first and second heat exchangers. A cycle control mechanism switches the valve mechanism between two positions, one of which enables refrigerant to flow to the first and second heat exchangers in one direction and the other position enables refrigerant to flow in the opposite direction. Bypass conduits are coupled to the first and second heat exchangers to pass at least a portion of the refrigerant around the heat exchangers. A temperature control mechanism measures the temperature of the refrigerant discharged from the compressor during the refrigerating and defrost cycles to at least partially open the bypass conduits when the temperature of the discharged refrigerant exceeds at least one predetermined temperature.

14 Claims, 12 Drawing Sheets

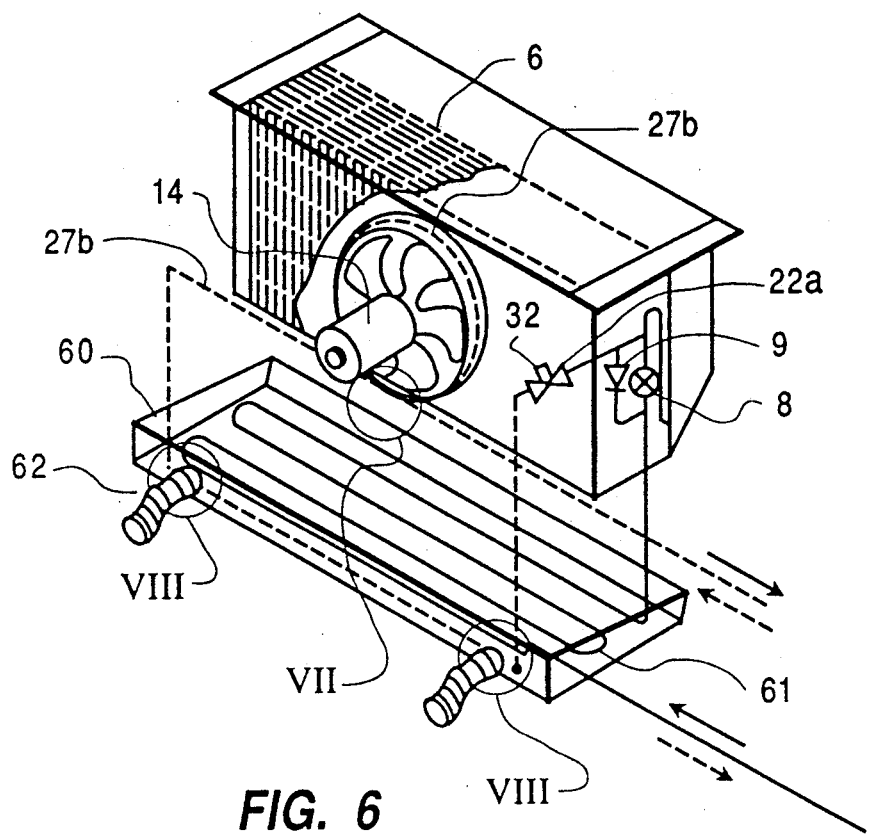
FIG. 6
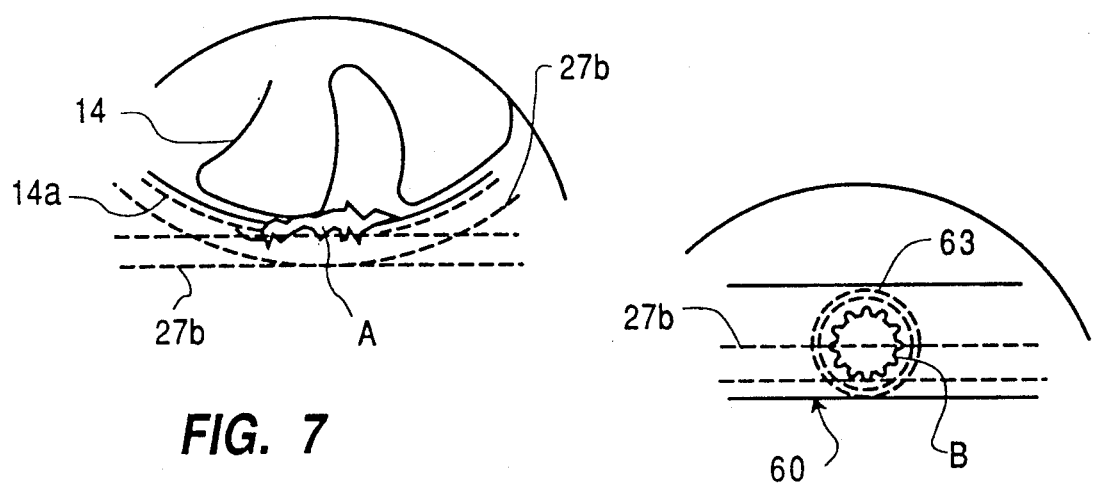
FIG. 7
FIG. 8

HEAT PUMP REFRIGERATION SYSTEM FOR A MOTOR VEHICLE

This application is a continuation of application Ser. No. 07/264,527, filed Oct. 31, 1988, now abandoned.

TECHNICAL FIELD

This invention relates to a heat pump refrigeration system having a compressor which is driven by a continuously variable speed engine for cycling refrigerant therein, and more particularly, to a heat pump refrigeration system for use as an automotive refrigerating system in a motor vehicle such as a truck in which the compressor is driven by the engine of the truck.

BACKGROUND OF THE INVENTION

Referring to FIG. 14, a schematic diagram of a conventional heat pump refrigeration system for a building is shown. The heat pump refrigeration system includes refrigerant compressor 1 which is driven by engine 2 through power transmission 3, e.g., a V-shaped belt. Engine 2 is typically a single speed engine or a multi-speed engine which operates at several fixed speeds in order to adjust the capacity of the compressor to which it is connected. The heat pump refrigeration system further includes four-way valve 4, first heat exchanger 5 which is located outside a refrigeration compartment, and second heat exchanger 6 which is located inside the refrigeration compartment. Outlet port 11 of compressor 1 is connected to inlet port 41 of four-way valve 4. Although not shown in FIG. 14, it is conventional to mount a thermal sensor adjacent second heat exchanger 6, which operates as an evaporator during a refrigerating cycle, to sense the amount of frost accumulating on the second heat exchanger by measuring its temperature. When the temperature decreases below a predetermined temperature, the heat pump refrigeration system switches to a defrosting cycle. This is accomplished by a conventional electrical circuit (not shown) which compares the voltage on the thermal sensor with a predetermined voltage, and generates an electrical signal which actuates four-way valve 4 when the temperature falls below the predetermined temperature. This electrical circuit also turns off fan 14 during the defrosting cycle. Thus, four-way valve 4 selectively switches between a refrigerating cycle and a defrosting cycle as illustrated by FIG. 14 and described in further detail below. In FIG. 14, first connecting port 42 of four-way valve 4 is connected to one end of first heat exchanger 5. The other end of first heat exchanger 5 is coupled with one end of second heat exchanger 6 through first check valve 7, first expansion valve 8, second check valve 9 and second expansion valve 10. The other end of second heat exchanger 6 is connected to second connecting port 43 of four-way valve 4. Third connecting port 44 of four-way valve 4 is connected to inlet port 12 of compressor 1.

In the refrigerating cycle, refrigerant flows in the refrigeration circuit in the direction shown by solid-line arrows in FIG. 14. Refrigerant which is discharged from compressor 1 flows into one end of first heat exchanger 5 through first connecting port 42 of four-way valve 4. Gaseous refrigerant at high temperature and pressure is condensed and heat is removed from the refrigerant at first heat exchanger 5. Refrigerant then flows from the other end of first heat exchanger 5 to first expansion valve 8 through first check valve 7. The refrigerant expands at first expansion valve 8 and flows into one end of second heat exchanger 6. The refrigerant is vaporized at second heat exchanger 6, and the refrigerant absorbs the surrounding heat to cool the refrigeration compartment. Thereafter, the refrigerant returns to inlet port 12 of compressor 1 through second and third connecting ports 43 and 44 of four-way valve 4. Accordingly, in the refrigerating cycle, first heat exchanger 5 is used as a condenser and second heat exchanger 6 is used as an evaporator.

On the other hand, in the defrosting cycle, refrigerant flows in the refrigeration circuit in the direction shown by dotted-line arrows. Gaseous refrigerant at high temperature and pressure discharged from outlet port 11 of compressor 1 flows into second heat exchanger 6 in a direction opposite to the direction of flow in the refrigerating cycle. Refrigerant flows through second connecting port 43 of four-way valve 4 to second heat exchanger 6. Gaseous refrigerant is condensed and heat is removed from the refrigerant at second heat exchanger 6, and the refrigerant changes into liquid refrigerant at high pressure. At this time, frost on the outer surface of second heat exchanger 6 in the refrigeration compartment melts into a drain pan (not shown). The water collected in the drain pan is removed through a drain hose (not shown). Liquid refrigerant at high pressure flows from second heat exchanger 6 through second check valve 9 to second expansion valve 10 where the pressure of the liquid refrigerant is lowered. The liquid refrigerant then flows into first heat exchanger 5 where it absorbs the surrounding heat and changes into a gaseous refrigerant. The gaseous refrigerant returns to inlet port 12 of compressor 1 through first and third connecting ports 42 and 44 of four-way valve 4. The gaseous refrigerant is compressed and again discharged by compressor 1. The above operation is repeated until the defrost on second heat exchanger 6 is removed. Accordingly, in the defrosting cycle, unlike the refrigerating cycle, first heat exchanger 5 is used as an evaporator and second heat exchanger 6 is used as a condenser.

One of the disadvantages of the above described conventional heat pump refrigeration system is that, in the event ambient temperature is high, the temperature of the refrigerant discharged from compressor 1 becomes extremely high in both the refrigerating and defrosting cycles. The temperature of the discharged refrigerant also may increase in multi-speed heat pump refrigeration systems when the system is operated at a high speed setting. Temperature increases may also occur due to transfer of heat between discharged and suctioned refrigerant at four-way valve 4, and heat conduction from engine 2 to compressor 1. Thus, compressor 1 may overheat, and it is possible that compressor 1 or a refrigerant hose connecting compressor 1 and four-way valve 4 will be damaged.

Another disadvantage of the above described conventional heat pump refrigeration system is that only partial defrosting may be accomplished during the defrosting cycle. When water drops on the drain pan, it may be refrigerated during the refrigerating cycle. If so, it is not necessary to melt the frost on second heat exchanger 6 during the defrosting cycle but also on the drain pan. In the conventional system, during the defrosting cycle, discharged gas refrigerant at high temperature and pressure is passed through a conduit mounted on the drain pan after it passes through second heat exchanger 6. However, when the refrigerant reaches the drain pan, its temperature has decreased and the capacity for defrosting is reduced. Water then freezes on the bottom portion of the drain pan and around the water discharge hole formed on the drain pan.

A further disadvantage of the conventional heat pump refrigeration system of FIG. 14 is that it is not readily adaptable for use on a motor vehicle with the compressor driven by the engine of the motor vehicle. Even though heat pump refrigeration systems are generally more efficient and have an improved defrosting cycle, such systems apparently have not been installed on motor vehicles and driven by the motor vehicle engine because of the continuously variable speed of such engines. If the compressor of a heat pump refrigeration system is driven by a continuously variable speed engine, the speed of the compressor also changes continuously. At high engine speed, which results in high compressor speed, the temperature of the refrigerant discharged from the compressor increases considerably which reduces the efficiency of the operation of both the defrosting and refrigerating cycles of the refrigeration system.

SUMMARY OF THE INVENTION

It is a primary object of this invention to provide a heat pump refrigeration system with a compressor which is capable of being driven by a continuously variable speed engine. In particular, it is a primary object of this invention to provide a heat pump refrigeration system for a motor vehicle such as a truck which has a compressor driven by the variable speed engine of the motor vehicle.

It is an object of this invention to provide a heat pump refrigeration system for a motor vehicle which is more efficient than conventional refrigeration systems for motor vehicles.

It is another primary object of this invention to provide an improved heat pump refrigeration system which compensates for increases in the temperature of the refrigerant discharged from the compressor to improve efficiency during both the refrigerating and defrosting cycles.

It is another object of this invention to provide a heat pump refrigeration system which controls the temperature of the refrigerant discharged from the compressor in both the refrigerating and defrost cycles to prevent excess heating in order to improve the operation of both the refrigerating and defrosting cycles.

It is another object of this invention to provide a heat pump refrigeration system with increased defrosting capacity and which is capable of defrosting a drain pan adjacent a heat exchanger mounted in the refrigeration compartment.

The present invention is directed to a heat pump refrigeration system which compensates for changes in the temperature of the refrigerant discharged from the compressor to improve operating efficiency during both the refrigerating and defrosting cycles. Additionally, the heat pump refrigerating system includes a compressor driven by a continuously variable speed engine, such as the engine of a motor vehicle. In particular, the heat pump refrigeration system of this invention is intended to be mounted on a motor vehicle and driven by the engine of the motor vehicle. Since the engine of the motor vehicle continuously undergoes changes in speed during normal operation, which changes the speed of operation of the compressor, the heat pump refrigeration system of this invention compensates for changes in the temperature of the refrigerant discharged from the compressor to alter the configuration of the refrigeration circuit in both the refrigerating and defrosting cycles to thereby maintain the temperature of the discharged refrigerant within an acceptable range.

The present invention includes a first thermal sensor responsive to the temperature of the discharged refrigerant and a first bypass conduit which bypasses the heat exchanger mounted in the refrigeration compartment. The bypass conduit includes an electromagnetic valve coupled to the thermal sensor for closing the bypass conduit to short circuit the heat exchanger in the refrigeration compartment when the temperature of the discharged refrigerant exceeds a first predetermined temperature during the refrigerating cycle. As a result, the temperature of the refrigerant supplied to the inlet of the compressor is lowered to thereby lower the temperature of the discharged refrigerant during the refrigerating cycle and keep it within a predetermined range.

For the defrosting cycle, the present invention includes a second thermal sensor responsive to the temperature of the refrigerant discharged from the compressor. A second bypass conduit is provided which bypass the heat exchanger mounted outside the refrigeration compartment. This second bypass conduit also includes an electromagnetic valve which is coupled to the second thermal sensor for closing the second bypass conduit to short circuit the heat exchanger mounted outside the refrigeration compartment when the temperature of the discharged refrigerant exceeds a second predetermined temperature during the defrosting cycle. By bypassing this heat exchanger during the defrosting cycle, the temperature of the refrigerant supplied to the inlet of the compressor is lowered to lower the temperature of the discharged refrigerant and keep it within a predetermined range.

As apparent from the above discussion, the present invention provides a mechanism for maintaining the temperature of the refrigerant discharged from the compressor within an acceptable range to improve the efficiency of both the refrigerating and defrosting cycles. Various embodiments for carrying out this objective are illustrated in the annexed drawings and described below as preferred embodiments.

Further objects, features and aspects of this invention will be understood from the following detailed description of the preferred embodiments of this invention referring to the annexed drawings.

BRIEF DESCRIPTION OF THE DRAWINGS

FIG. 6 is a schematic view illustrating a conduit disposed in a heat exchanger and drain pan in the third embodiment of FIG. 5.

FIG. 7 is an enlarged perspective illustrating a fan shroud shown in section VII in FIG. 6.

FIG. 8 is an enlarged perspective illustrating a drain hole on the drain pan shown as section VIII in FIG. 6.

DETAILED DESCRIPTION OF THE PREFERRED EMBODIMENTS

Figure 1:
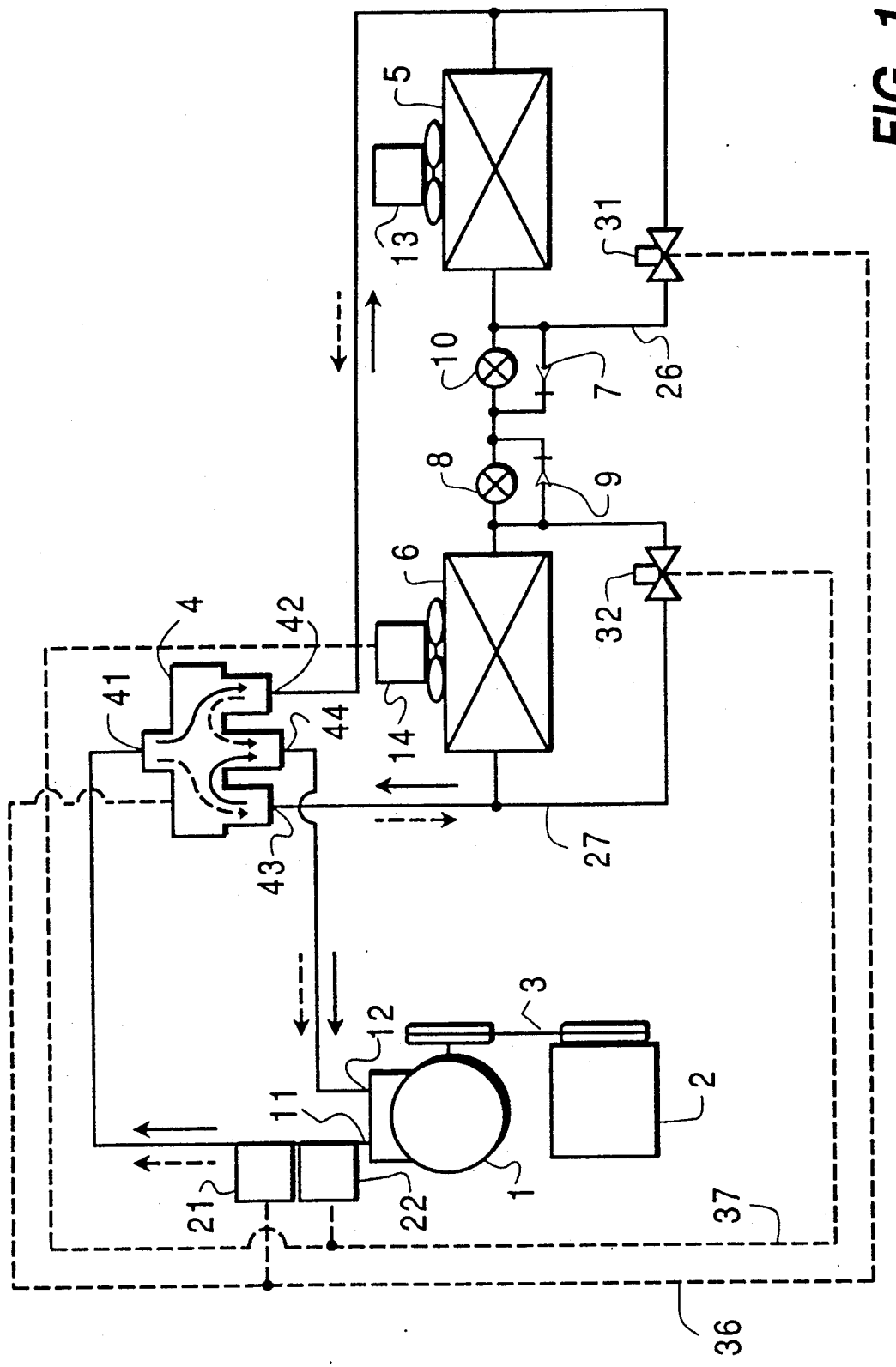
FIG. 1 is a circuit diagram illustrating a heat pump system in accordance with a first embodiment of this invention.
Figure 14:
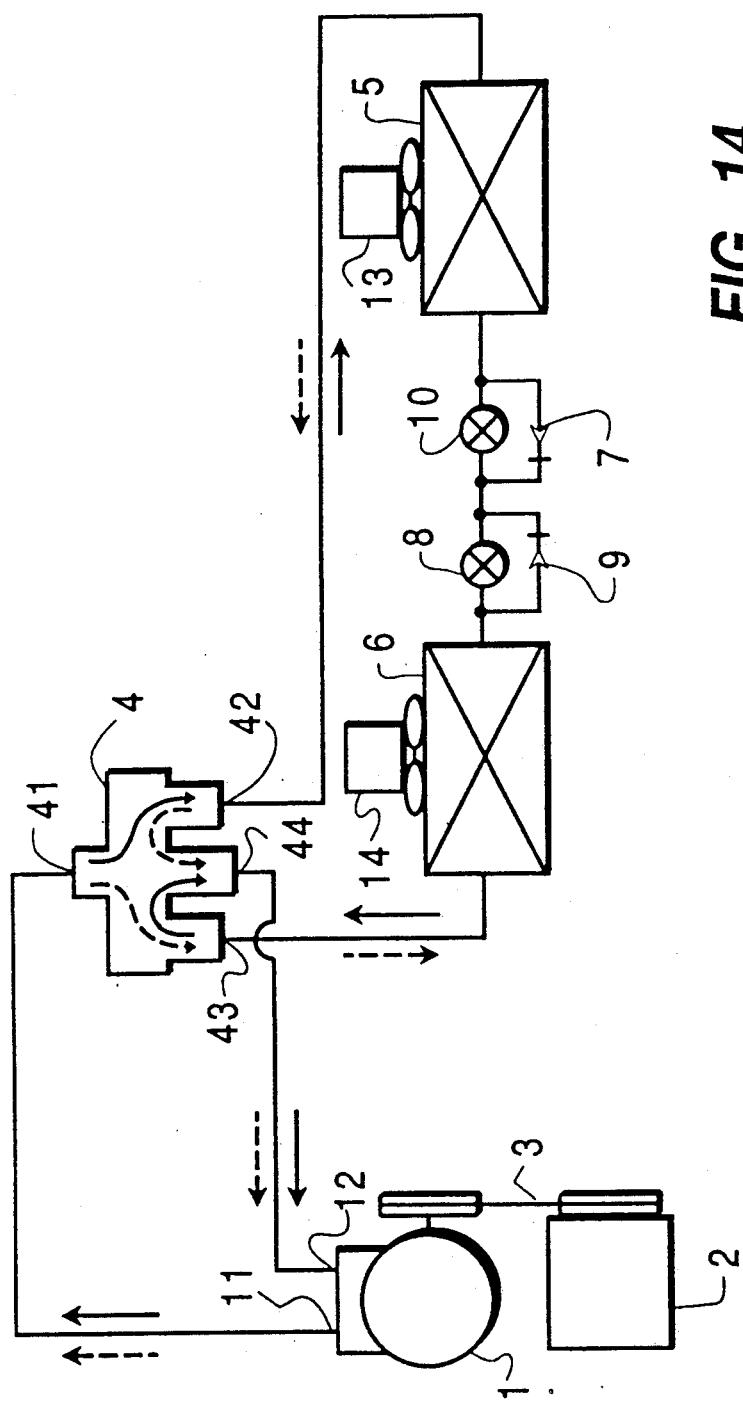
FIG. 14 is a circuit diagram illustrating a conventional heat pump system.

Referring to FIG. 1, a heat pump refrigeration system in accordance with a first embodiment of the present invention is shown. The heat pump refrigeration system includes compressor 1 driven by continuously variable speed engine 2 through power transmission 3. Preferably, the heat pump refrigeration system is mounted on a motor vehicle and engine 2 is the engine of the motor vehicle. As to the remaining elements of FIG. 1, to simplify the description, reference numerals used in FIG. 1 are the same as those used in FIG. 14 to identify like components. In the first embodiment of FIG. 1, first bypass conduit 26 directly connects both ends of first heat exchanger 5 to bypass this heat exchanger. First electromagnetic control valve 31 is disposed in first bypass conduit 26 in parallel with first heat exchanger 5 to control the volume of refrigerant. Second bypass conduit 27 directly connects both ends of second heat exchanger 6 to bypass this heat exchanger. Second electromagnetic control valve 32 is disposed in second bypass conduit 27 to control the volume of the refrigerant. First and second thermal sensors 21 and 22 are disposed adjacent outlet port 11 of compressor 1 to detect the temperature of the discharged refrigerant.

Figure 2A:
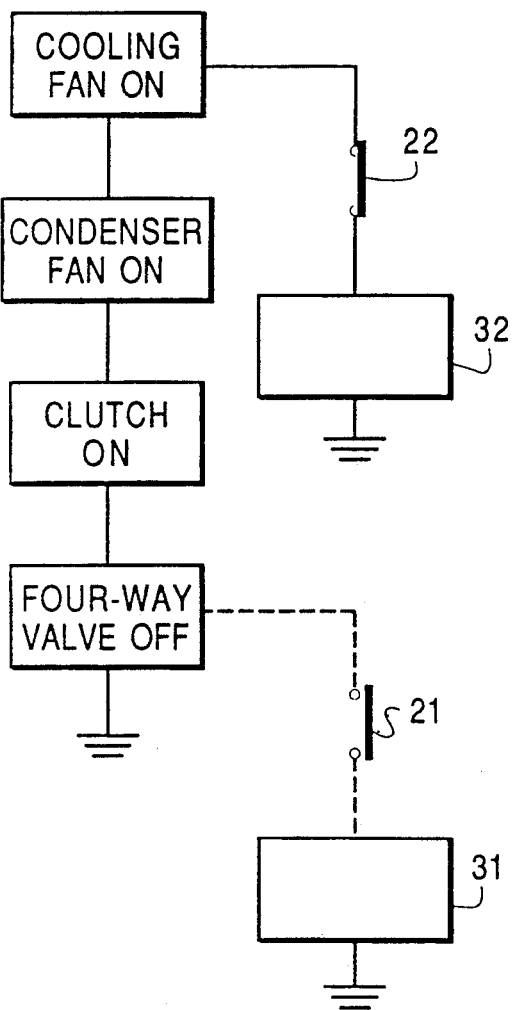
FIG. 2(a) is a state diagram illustrating operation of the FIG. 1 circuit diagram during the refrigerating cycle.
Figure 2B:
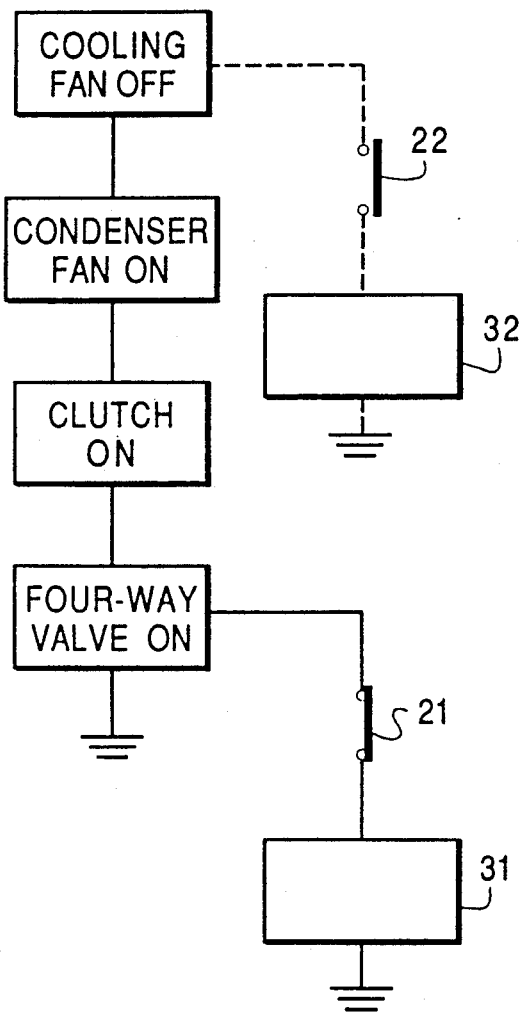
FIG. 2(b) is a state diagram illustrating operation of the FIG. 1 circuit diagram during the defrosting cycle.

An electrical control circuit for the heat pump refrigeration circuit of FIG. 1 is not shown in detail, but the relationship between the electrical circuit elements is shown by dotted lines in FIG. 1 and a state diagram for the elements controlled by the electrical control circuit is shown in FIG. 2. As described in connection with the conventional refrigeration system of FIG. 14, typically a defrost sensor is disposed adjacent the heat exchanger mounted in the refrigeration compartment, which in this case is heat exchanger 6, to detect the temperature of this heat exchanger. The defrost sensor, which is part of the electrical control circuit, provides a signal which enables the electrical control circuit to automatically switch between the refrigerating and defrosting cycles by actuating four-way valve 4 when the temperature detected by the defrost sensor is below a predetermined level. The electrical control circuit for accomplishing the above function is conventional, and may be either an analog circuit or a digital circuit which includes a microcomputer which receives an input signal from the defrost sensor through an A/D converter and generates an output signal which controls the operation of a solenoid associated with four-way valve 4 to change the position of this valve from the refrigerating cycle position to the defrosting cycle position and vice versa. The electrical control circuit generally controls the operation of fans 13 and 14 as well.

In the present invention, either an analog or digital electrical control circuit, the latter of which would be a microcomputer based control circuit, is contemplated. Since the configuration of both an analog and digital control circuit, and programming of such a digital control circuit, would be apparent to one of skill in the art from the relationship of the electrical circuit elements depicted in FIG. 1 and the state diagram of FIG. 2, the precise details of the control circuits are not illustrated. However, in the case of the present invention, it is contemplated that thermal sensors 21 and 22 (together with the defrost sensor) may provide input signals to a microcomputer through an A/D connecter, and the microcomputer then would generate output signals in response to these input signals to control electromagnetic valves 31 and 32, the solenoid associated with four-way valve 4 and fan 14 through appropriate output driven circuits. The programming of a microcomputer to carry out all the above control functions would be apparent to one of skill in the art from the description of the relationship between the elements and the state diagram which follows.

First thermal sensor 21, which is responsive to the position of four-way valve 4, controls the operation of first electromagnetic valve 31 through first control line 36. When the temperature of the discharged refrigerant from compressor 1 is higher than or equal to a first predetermined temperature, first thermal sensor 21 sends a first open-control signal to first electromagnetic valve 31, and first electromagnetic valve 31 operates to open first conduit 26. When the temperature is below the first predetermined temperature, first thermal sensor 21 sends a first close-control signal to first electromagnetic valve 31, and first electromagnetic valve 31 operates to close first conduit 26.

Second thermal sensor 22, which is associated with cooling fan 14 in that this sensor is connected and disconnected to circuit as cooling fan 14 is turned on and off, respectively, is connected to second electromagnetic valve 32 through second control line 37. When cooling fan 14 is turned on during the refrigerating cycle, the signal provided by sensor 22 is connected to the circuit. When the temperature of the discharged refrigerant is higher than or equal to a second predetermined temperature, second thermal sensor 22 sends a second open-control signal to second electromagnetic valve 32, and second electromagnetic valve 32 operates to open second conduit 27. When discharged refrigerant temperature is below the second predetermined temperature, second thermal sensor 22 sends a second close-control signal to second electromagnetic valve 32, and second electromagnetic valve 32 operates to close second conduit 27.

The operation of the heat pump refrigeration system according to the first embodiment of this invention is shown in FIG. 2. During the refrigerating cycle, second thermal sensor 22 is turned on when cooling fan 14 starts to operate. However, at this time, since four-way valve 4 is off, first thermal sensor 21 does not operate. Accordingly, only second electromagnetic valve 32 operates to open or close second conduit 27. During the refrigerating cycle, refrigerant passes through first heat exchanger 5 and first check valve 7 into second heat exchanger 6 through first expansion valve 8. However, if the rotational speed of compressor 1, i.e., the engine speed, or the ambient air temperature increases, the temperature of the refrigerant discharged from compressor 1 becomes higher than or equal to the second predetermined temperature, and second thermal sensor 22 sends the open-control signal to second electromagnetic valve 32 to open second conduit 27. Accordingly, gas refrigerant at low temperature flowing from first heat exchanger 5 directly flows into inlet port 12 of compressor 1, which causes the temperature of the refrigerant discharged from compressor 1 to gradually decrease. Thereafter, when the discharged refrigerant temperature drops below the second predetermined temperature again, second thermal sensor 22 sends the second close-control signal to second electromagnetic valve 32 to close second conduit 27. Thereafter, the temperature of the gas refrigerant again begins to rise as it absorbs heat at second heat exchanger 6. As refrigerant at a high temperature flows into inlet port 12 of compressor 1 through four-way valve 4, the temperature of the refrigerant discharged from compressor 1 gradually increases. Therefore, the temperature of the discharged refrigerant can be controlled near the second predetermined temperature.

On the other hand, during the defrosting cycle, second thermal sensor 22 is off when cooling fan 14 stops operating. Also, since four-way valve 4 is turned on, first thermal sensor 21 controls first electromagnetic valve 31. During the defrosting cycle, refrigerant which passes through second heat exchanger 6 flows into first heat exchanger 5 through first check valve 9 and second expansion valve 10. However, if the rotational speed of compressor 1 or the ambient air temperature increases, the temperature of the refrigerant discharged from compressor 1 becomes higher than or equal to the first predetermined temperature, and first thermal sensor 21 sends the first open-control signal to first electromagnetic valve 31 to open first conduit 26. Accordingly, gas refrigerant at low temperature from second heat exchanger 6 directly flows into inlet port 12 of compressor 1, and the temperature of the refrigerant discharged from compressor 1 is gradually decreased. Thereafter, when the discharged refrigerant temperature drops below the first predetermined temperature again, first thermal sensor 21 sends the first close-control signal to first electromagnetic valve 31 to close first conduit 26. Thereafter, the temperature of the gas refrigerant again begins to rise as it absorbs heat at first heat exchanger 5. As refrigerant at a higher temperature flows into inlet port 12 of compressor 1 through four-way valve 4, the temperature of the refrigerant discharged from compressor 1 gradually increases. Therefore, the temperature of the discharged refrigerant can be controlled near the first predetermined temperature.

Figure 3:
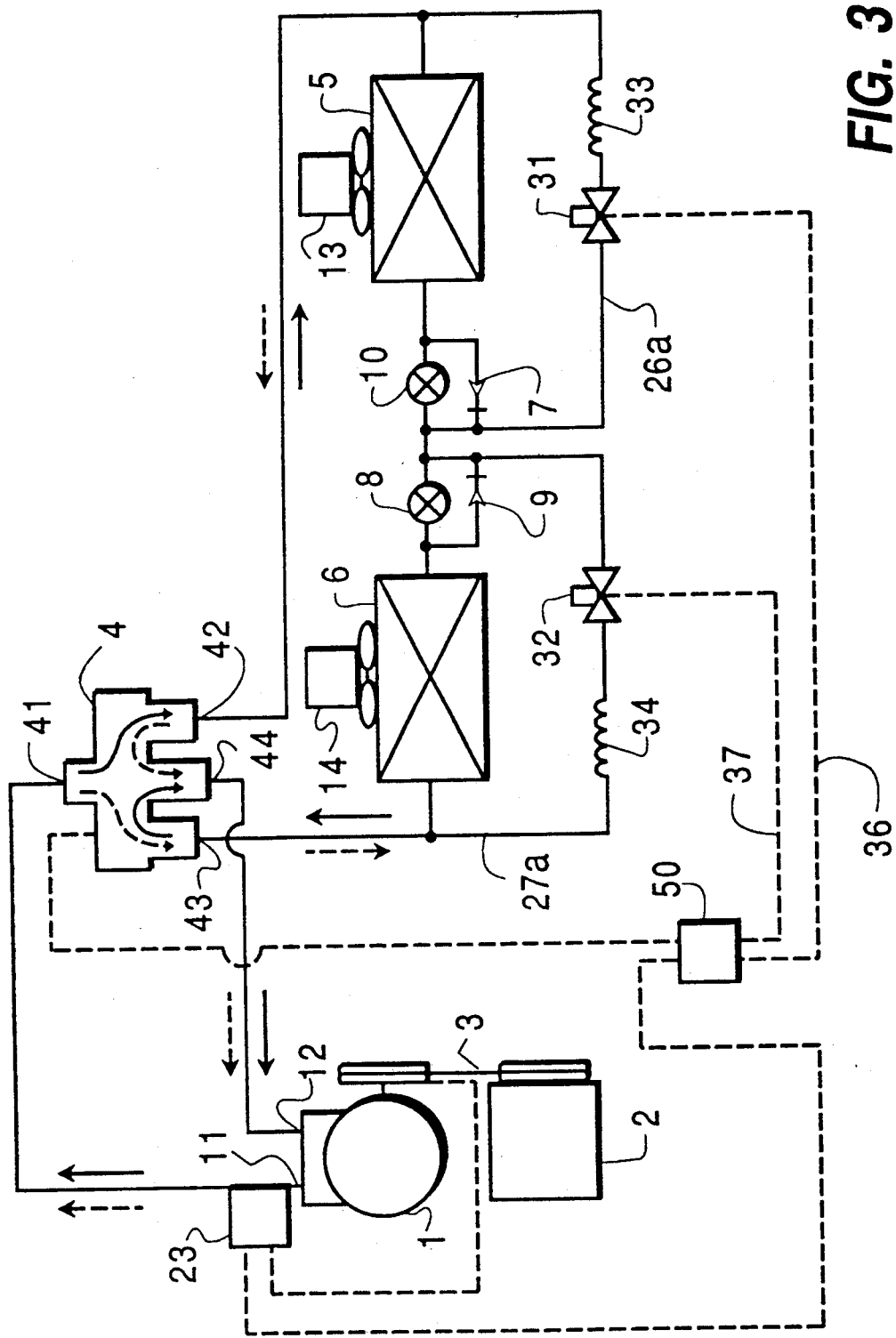
FIG. 3 is a circuit diagram illustrating a heat pump system in accordance with a second embodiment of this invention.

Referring to FIG. 3, a heat pump system in accordance with a second embodiment of the present invention is shown. Bypass conduit 26a is connected across first heat exchanger 5, first check valve 7 and second expansion valve 10. First capillary tube 33 is disposed between one end of first heat exchanger 5 and first electromagnetic valve 31 along third conduit 26a. Bypass conduit 27a is connected across second heat exchanger 6, second check valve 9 and first expansion valve 8. Second capillary tube 34 is disposed between one end of second heat exchanger 6 and second electromagnetic valve 32 along conduit 27a. Thermal sensor 23 is disposed adjacent outlet port 11 of compressor 1 to detect the temperature of the refrigerant discharged therefrom.

Thermal sensor 23, which is connected to an electromagnetic clutch (not shown) to transmit power to compressor 1 from engine 2, is connected to relay 50. Four-way valve 4 also is connected to relay 50. Relay 50 is connected to first electromagnetic valve 31 and second electromagnetic valve 32 through first control line 36 and second control line 37, respectively. When the temperature of discharged refrigerant is higher than or equal to a predetermined temperature, thermal sensor 23 sends an open-control signal to relay 50. On the contrary, when the temperature of discharged refrigerant is below the predetermined temperature, thermal sensor 23 sends a close-control signal to relay 50. Dependent on whether four-way valve 4 is in the defrosting or refrigerating cycle, relay 50 sends either the open-control signal or the close-control signal from thermal sensor 23 to electromagnetic valves 31 and 32. First electromagnetic valve 31 opens or closes bypass conduit 26a according to the open-control signal or close-control signal from thermal sensor 23. Second electromagnetic valve 32 also opens or closes bypass conduit 27a according to the open-control signal or close-control signal from thermal sensor 23.

Figure 4A:
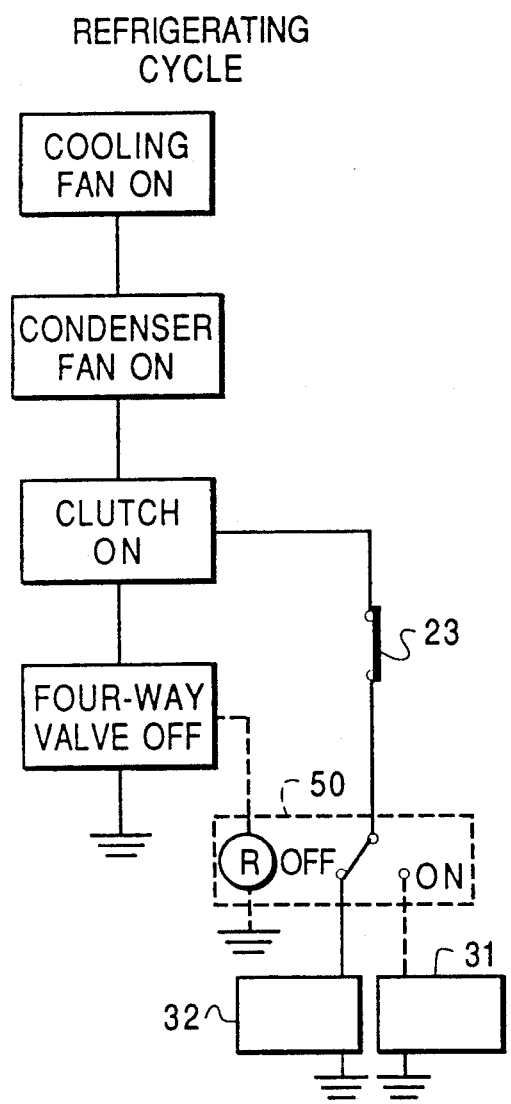
FIG. 4(a) is a state diagram illustrating operation of the FIG. 3 circuit diagram during the refrigerating cycle.
Figure 4B:
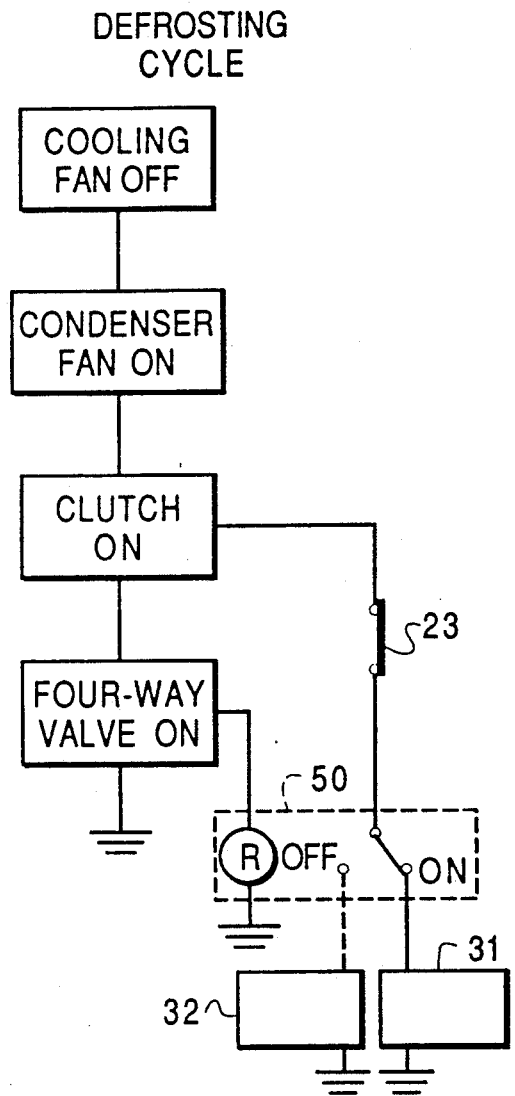
FIG. 4(b) is a state diagram illustrating operation of the FIG. 3 circuit diagram during the defrosting cycle.

The operation of the heat pump system according to the second embodiment of this invention is shown in FIG. 4. Thermal sensor 23 starts to operate when the electromagnetic clutch, which is mounted on compressor 1, is turned on. During the refrigerating cycle, since four-way valve 4 is off, relay 50 is not supplied with electrical current, and does not operate to connect thermal sensor 23 with first electromagnetic valve 31. Accordingly, second electromagnetic valve 32 is supplied with electrical current, and operates to open and close conduit 27a. During the refrigerating cycle, refrigerant which passes through first heat exchanger 5 flows into second heat exchanger 6 through first check valve 7 and first expansion valve 8. However, if the rotational speed of compressor 1, i.e., the engine speed, or the ambient air temperature increases, the temperature of the refrigerant discharged from compressor 1 becomes higher than or equal to the predetermined temperature, and thermal sensor 23 sends the open-control signal to second electromagnetic valve 32 through relay 50 to open conduit 27a. Accordingly, gas refrigerant at low temperature from first heat exchanger 5, passes through first check valve 7 and second capillary tube 34 to inlet port 12 of compressor 1, and the temperature of the refrigerant discharged from compressor 1 is gradually decreased. Thereafter, when the temperature of the discharged refrigerant is below the predetermined temperature again, thermal sensor 23 sends the close-control signal to second electromagnetic valve 32 through relay 50 to close conduit 27a. Thereafter, the temperature of the gas refrigerant again begins to rise as it absorbs heat at second heat exchanger 6. As refrigerant at high temperature flows into inlet port 12 of compressor 1 through four-way valve 4, the temperature of the refrigerant discharged from compressor 1 gradually increases. Therefore, the temperature of the discharged refrigerant can be controlled near the predetermined temperature.

On the other hand, during the defrosting cycle, since four-way valve 4 is turned on, relay 50 is supplied with electric current, and operates to connect thermal sensor 23 with first electromagnetic valve 31. First electromagnetic valve 31 operates to open and close third conduit 26a. During the defrosting cycle, refrigerant passes through second heat exchanger 6 and flows into first heat exchanger 5 through second check valve 9 and second expansion valve 10. However, as mentioned above, if the rotational speed of compressor 1 or the ambient air temperature increases, the temperature of the refrigerant which is discharged from compressor 1 becomes higher than or equal to the predetermined temperature, and thermal sensor 23 sends the open-control signal to first electromagnetic valve 31 to open conduit 26a. Accordingly, gas refrigerant at low temperature from second heat exchanger 6 passes through second check valve 9 and first capillary tube 33, and thereafter flows into inlet port 12 of compressor 1, and the temperature of the refrigerant discharged from compressor 1 gradually decreases. Thereafter, when the discharged refrigerant temperature again drops below the predetermined temperature, thermal sensor 23 sends the close-control signal to first electromagnetic valve 31 to close conduit 26a. Thereafter, the temperature of the gas refrigerant again begins to rise as it absorbs heat at first heat exchanger 5. As refrigerant at higher temperature flows into inlet port 12 of compressor 1 through four-way valve 4, the temperature of the refrigerant discharged from compressor 1 gradually increases. Therefore, the discharged refrigerant temperature can be controlled near the predetermined temperature.

Referring to FIGS. 5, 6, 7 and 8, a heat pump system in accordance with a third embodiment of the present invention is shown. The same reference numerals appear in FIGS. 5-8 to identify elements of the same construction as shown in FIG. 1, and the description of such elements is omitted to simplify the specification.

In FIGS. 5-8, thermal sensor 22a is disposed adjacent outlet port 11 of compressor 1, and is connected to relay 50a and second electromagnetic valve 32. Relay 50a is connected to cooling fan 14 and an electromagnetic clutch which is mounted on compressor 1. During the refrigerating cycle, thermal sensor 22a sends a second open-control signal to second eletromagnetic valve 32 when the temperature of the refrigerant discharged from compressor 1 is higher than or equal to a second predetermined temperature. When the discharged refrigerant temperature is below the second predetermined temperature, thermal sensor 22a sends a second close-control signal to second electromagnetic valve 32. On the other hand, during the defrosting cycle, thermal sensor 22a sends a third close-control signal to second electromagnetic valve 32 when the discharged refrigerant temperature is higher than or equal to the second predetermined temperature. Also, when the discharged refrigerant temperature is below the second predetermined temperature, thermal sensor 22a sends a third open-control signal to second electromagnetic valve 32. Second electromagnetic valve 32 opens or closes second conduit 27b according to the third open-control signal or third close-control signal from thermal sensor 22a.

Drain pan 60, which includes defrosting pipe 61 therein, is disposed under second heat exchanger 6 to receive the water which drops from the outer surface of second heat exchanger 6 during the defrosting cycle. The water collected in drain pan 60 is exhausted through drain hose 62 through holes 63 formed in drain pan 60. During the defrosting cycle, the refrigerant which passes through second heat exchanger 6 flows into defrosting pipe 61 through second check valve 9, and prevents frosting on drain pan 60. Second conduit 27b is disposed around pan shroud 14a of cooling pan 14 and holes 63 of drain pan 60 to circulate refrigerant at high temperature, and prevent frosting on portion A of shroud 14a and portion B on the inside of holes 63.

Figure 9A:
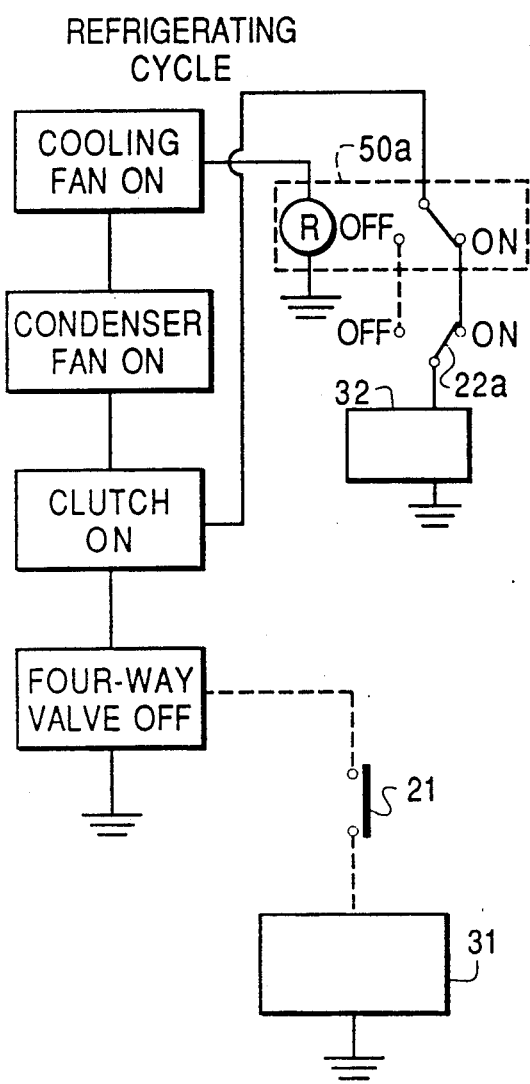
FIG. 9(a) is a state diagram illustrating operation of the FIG. 5 circuit diagram during the refrigerating cycle.
Figure 9B:
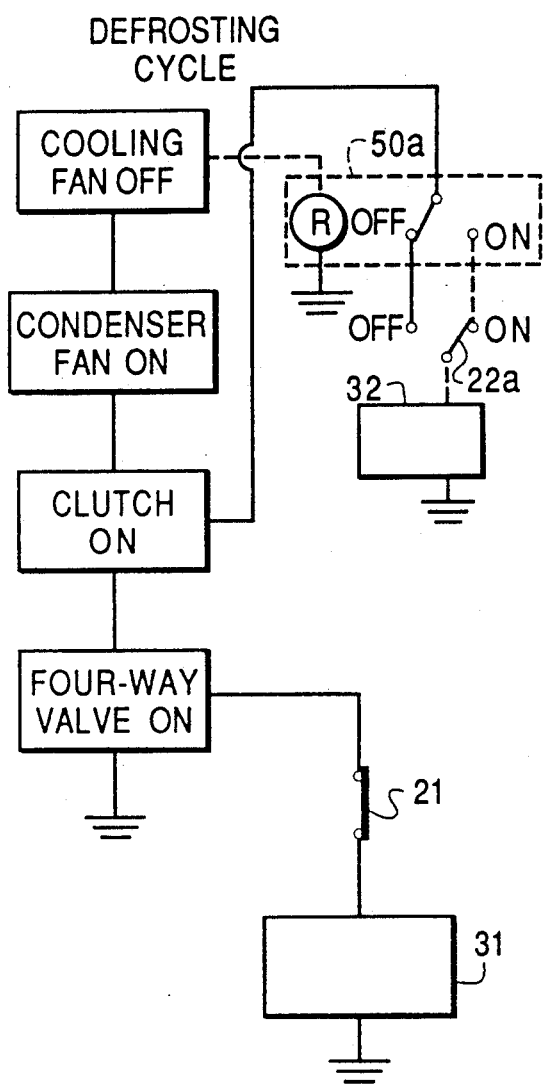
FIG. 9(b) is a state diagram illustrating operation of the FIG. 5 circuit diagram during the defrosting cycle.

The operation of the heat pump system according to the third embodiment of this invention is shown in FIG. 9. During the refrigerating cycle, relay 50a is turned on when cooling fan 14 starts to operate, and second thermal sensor 22a also is turned on. However, at this time, since four-way valve 4 is off, first thermal sensor 21 does not operate. Accordingly, only second electromagnetic valve 32 operates to open and close second conduit 27b. When the temperature of the refrigerant discharged from compressor 1 is higher than the second predetermined temperature, second thermal sensor 22a sends the second open-control signal to second electromagnetic valve 32 to open second conduit 27b. Thereafter, when the discharged refrigerant temperature again drops below the second predetermined temperature, second thermal sensor 22a sends the second close-control signal to second electromagnetic valve 32 to close second conduit 27b. Therefore, the discharged refrigerant temperature can be controlled near the second predetermined temperature. Further description of the refrigerating cycle is omitted since it is the same as described above in the first embodiment.

On the other hand, during the defrosting cycle, relay 50a is turned off when cooling fan 14 stops operating. Accordingly, second thermal sensor 22a sends the third close-control signal to second electromagnetic valve 32 when the temperature of the refrigerant discharged from compressor 1 is higher than or equal to the second predetermined temperature. When the discharged refrigerant temperature drops below the second predetermined temperature, second thermal sensor 22a sends the third open-control signal to second electromagnetic valve 31. Therefore, during the defrosting cycle, first thermal sensor 21 controls first electromagnetic valve 31 to open or close first conduit 26. Further description of first thermal sensor 21 is omitted since it is the same as described above in the first embodiment.

The operation of second thermal sensor 22a during the defrosting cycle is as follows. When the temperature of the refrigerant discharged from compressor 1 is higher than or equal to the second predetermined temperature, second thermal sensor 22a sends the third close-control signal to second electromagnetic valve 32. Accordingly, the refrigerant discharged from compressor 1 flows into second heat exchanger 6 through four-way valve 4 to melt the accumulated frost on the outer surface of second heat exchanger 6. Melted frost or water drops on drain pan 60 and is exhausted through drain hose 62. At this time (during defrosting), when the discharged refrigerant temperature is below the second predetermined temperature, second thermal sensor 22a sends the third open-control signal to second electromagnetic valve 32, and second electromagnetic valve 32 opens second conduit 27b. The discharged refrigerant flows into second conduit 27b through four-way valve 4. Since second conduit 27b extends around fan shroud 14a and holes 63, it melts the accumulated frost on these elements. Thereafter, the refrigerant flows through drain pipe 61 through second check valve 9. The above arrangement greatly improves defrosting capacity by using refrigerant at the higher temperature to first remove accumulated first on the fan shroud to prevent the accumulated frost from stopping the fan and remove accumulated frost on the drain holes to permit water to escape.

Figure 5:
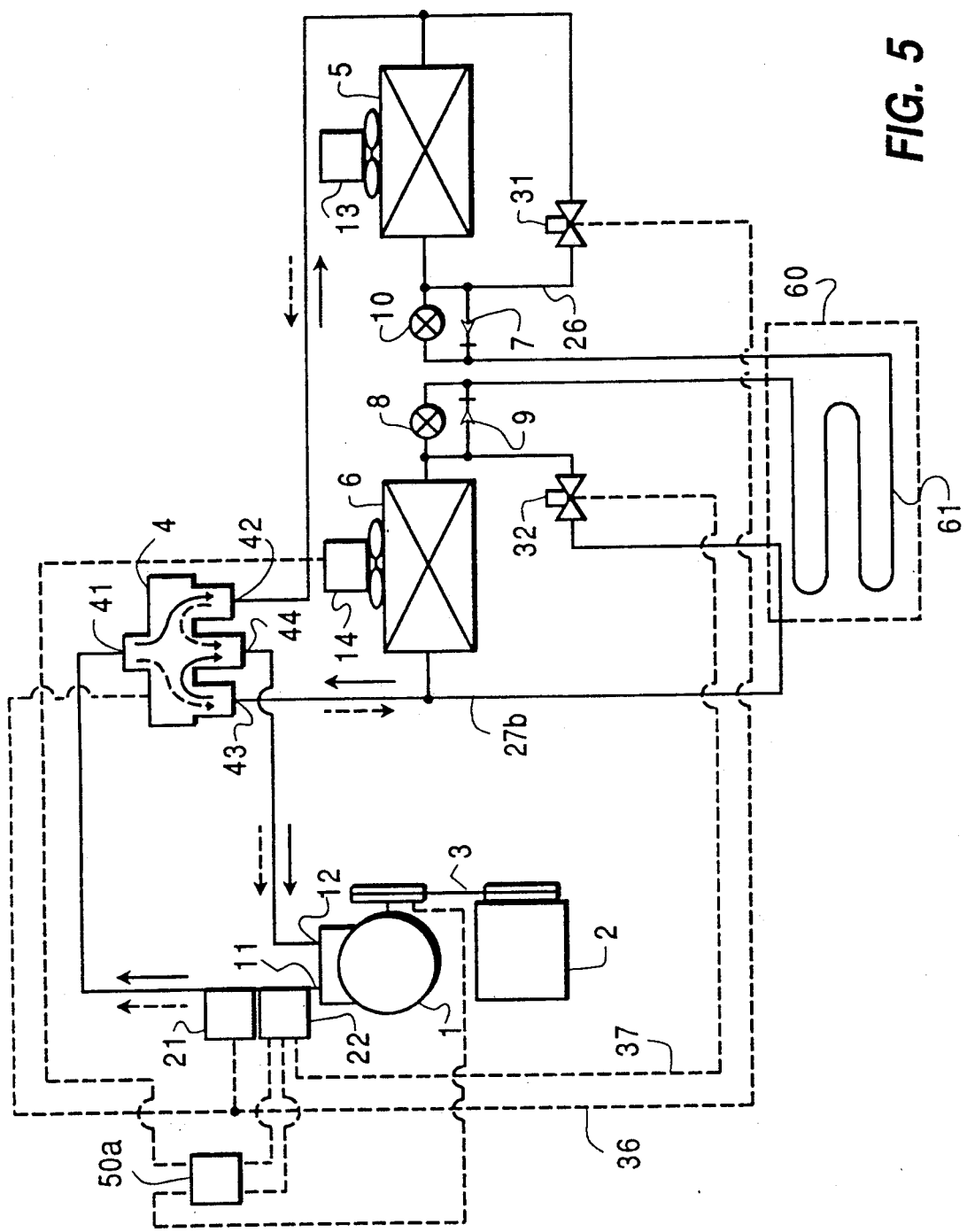
FIG. 5 is a circuit diagram illustrating a heat pump system in accordance with a third embodiment of this invention.
Figure 10:
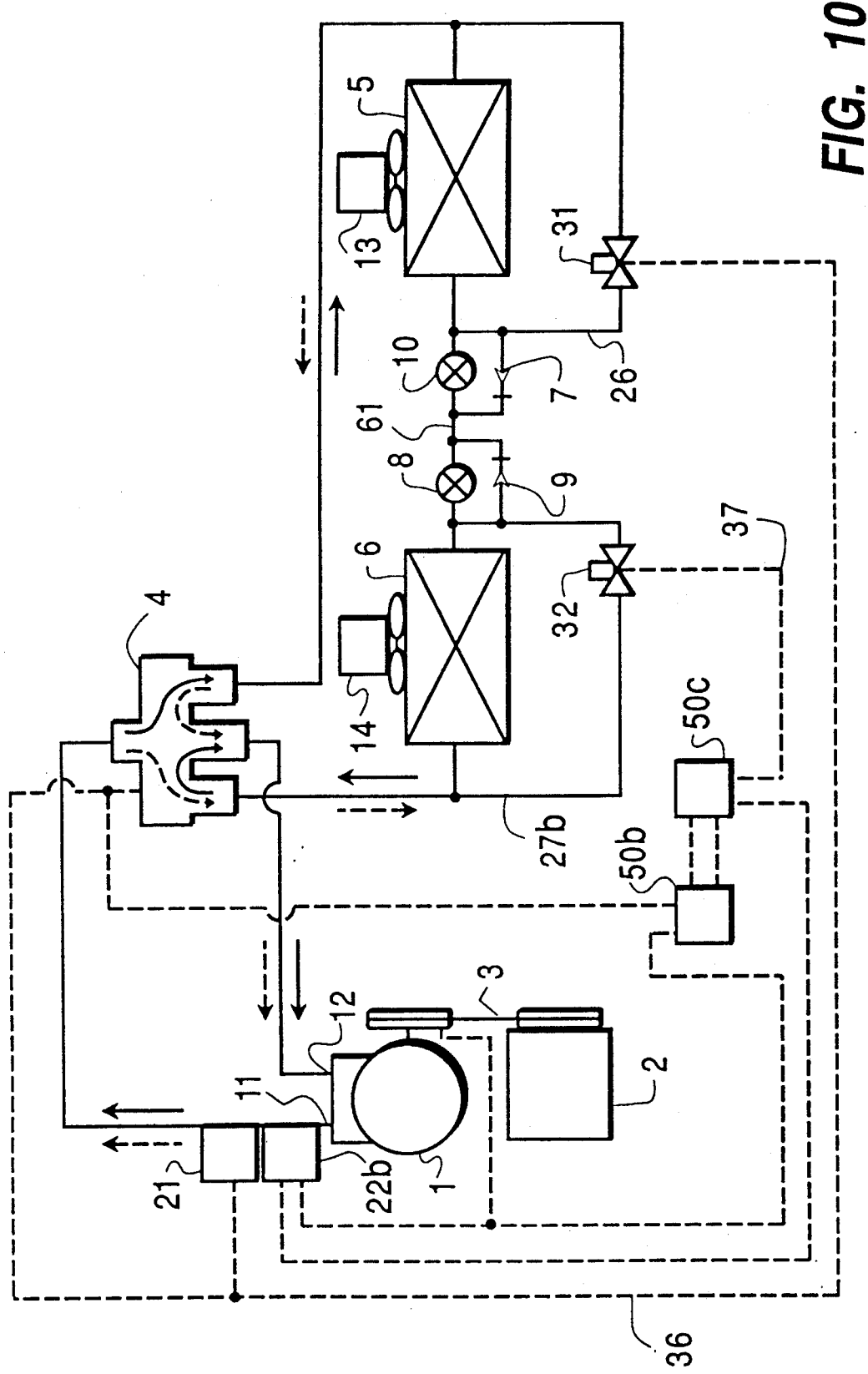
FIG. 10 is a circuit diagram illustrating a heat pump system in accordance with a fourth embodiment of this invention.

Referring to FIG. 10, a heat pump refrigeration system in accordance with a fourth embodiment of this invention is shown. The same reference numerals are applied to FIG. 10 to elements of the same construction as shown in FIG. 5 and the description of such elements is omitted to simplify the specification.

In FIG. 10, relay 50b is connected to four-way valve 4 and an electromagnetic clutch which is mounted on compressor 1. Second thermal sensor 22b is connected to relay 50c and the electromagnetic clutch. Relay 50c is connected to second electromagnetic valve 32. During the refrigeration cycle, second thermal sensor 22b sends a second open-control signal to second electromagnetic valve 32 when the temperature of the refrigerant discharged from compressor 1 is higher than or equal to a second predetermined temperature. This is accomplished under the control of relays 50b and 50c. When the discharged refrigerant temperature drops below the second predetermined temperature, second thermal sensor 22b sends a second close-control signal to second electromagnetic valve 32. On the other hand, during the defrosting cycle, as described in the third embodiment, second thermal sensor 22b sends a third close-control signal to second electromagnetic valve 32 when the discharged refrigerant temperature is higher than or equal to the second predetermined temperature. When the discharged refrigerant temperature drops below the second predetermined temperature, second thermal sensor 22b sends a third open-control signal to second electromagnetic valve 32. Second electromagnetic valve 32 opens second conduit 27b according to the second and third open-control signals, and closes second conduit 27b according to the second and third close-control signals.

Figures 11A, 11B:
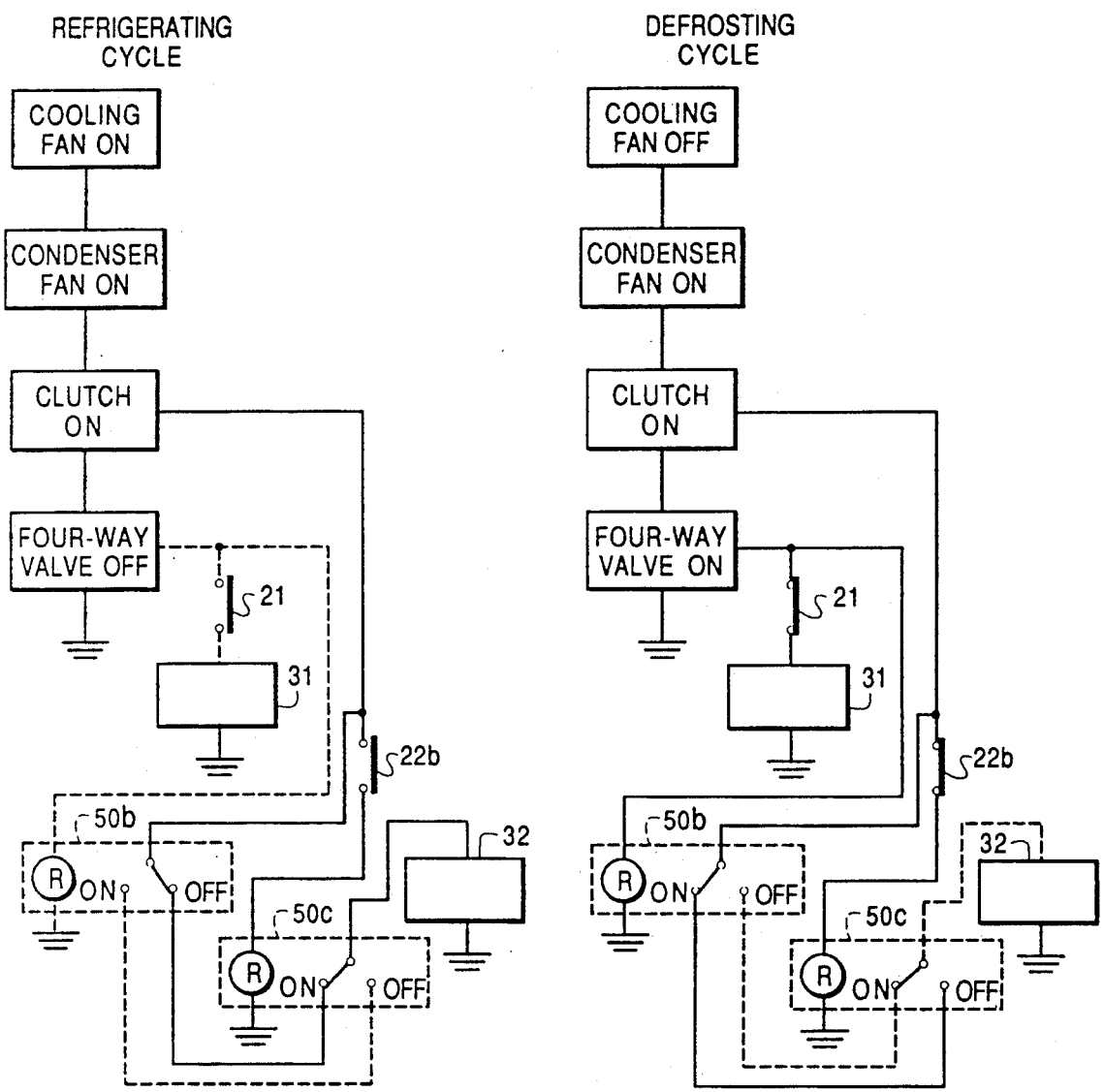
FIG. 11(a) is a state diagram illustrating operation of the FIG. 10 circuit diagram during the refrigeration cycle.
FIG. 11(b) is a state diagram illustrating operation of the FIG. 10 circuit diagram during the defrosting cycle.

The operation of the heat pump system according to the fourth embodiment of this invention is shown in FIG. 11. During the refrigerating cycle, when the electromagnetic clutch starts to operate, second thermal sensor 22b is operational. However, at this time, since four-way valve 4 is off, first thermal sensor 21 and relay 50b are not operational. When the temperature of the refrigerant discharged from compressor 1 is higher than the second predetermined temperature, relay 50c is actuated to close its contacts, and second thermal sensor 22b sends the second open-control signal to second electromagnetic valve 32 to open second conduit 27b. Thereafter, when the discharged refrigerant temperature again drops below the second predetermined temperature, second thermal sensor 22b sends the second close-control signal to second electromagnetic valve 32 to close second conduit 27b. Accordingly, second electromagnetic valve 32 is controlled by second thermal sensor 22b to open and close second conduit 27b. Further description of the refrigerating cycle is omitted since it is the same as described in the first embodiment.

On the other hand, during the defrosting cycle, when the electromagnetic clutch starts to operate, second thermal sensor 22b is operational. At this time, since four-way valve 4 is on, first thermal sensor 21 and relay 50b are also operational. That is, first thermal sensor 21 controls first electromagnetic valve 31 and the contacts of relay 50b are closed. When the temperature of the refrigerant discharged from compressor 1 is higher than the second predetermined temperature, relay 50c is actuated to close its contacts, and second thermal sensor 22b sends the third close-signal to second electromagnetic valve 32 to close second conduit 27b. Thereafter, when the discharged refrigerant temperature again drops below the second predetermined temperature, second thermal sensor 22b sends the third open-control signal to second electromagnetic valve 32 to open second conduit 27b. Accordingly, first electromagnetic valve 31 is controlled by first thermal sensor 21 to open and close first conduit 26 and second electromagnetic valve 32 is controlled by second thermal sensor 22b to open and close second conduit 27b. Further description of the operation of first electromagnetic valve 31 during the defrosting cycle is omitted since it is the same as described in the first embodiment. Also, further description of second electromagnetic valve 32 is omitted since it is the same as described in the third embodiment.

Figure 12:
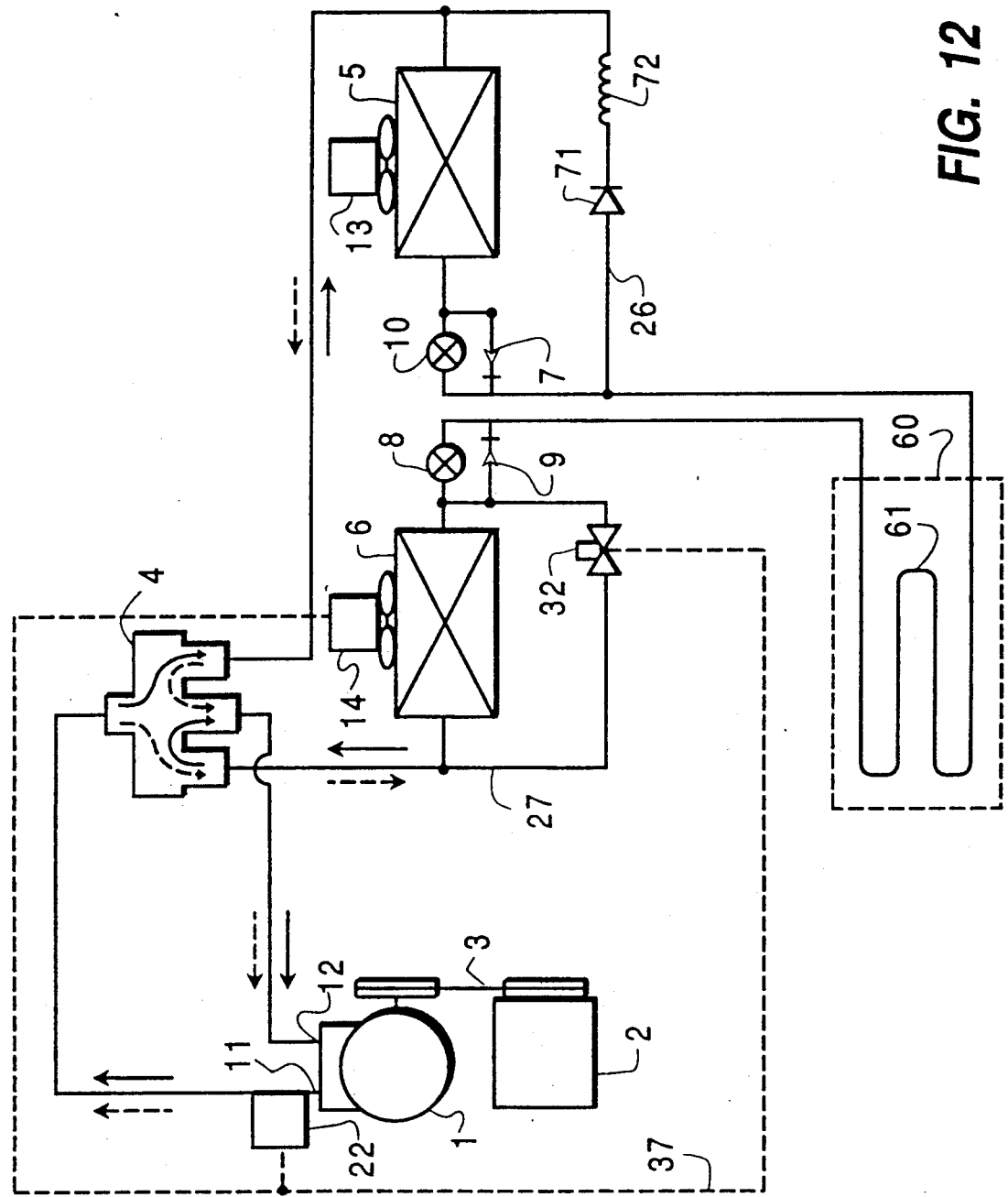
FIG. 12 is a circuit diagram illustrating a heat pump system in accordance with a fifth embodiment of this invention.

Referring to FIG. 12, a heat pump refrigeration system in accordance with a fifth embodiment of the present invention is shown. The same reference numerals are applied in FIG. 12 to elements of the same construction as shown in FIG. 1 and the description of such elements is omitted to simplify the specification.

In FIG. 12, second thermal sensor 22 is disposed adjacent outlet port 11 of compressor 1 to detect the discharged refrigerant compressor. This sensor is operational when cooling fan 14 is turned on during the refrigerating cycle, and it controls electromagnetic valve 32 through control line 37. Third check valve 71 and capillary tube 72 are disposed along first conduit 26. When the discharged refrigerant temperature is higher than or equal to a predetermined temperature, thermal sensor 22 sends an open-control signal to electromagnetic valve 32, and electromagnetic valve 32 operates to open second conduit 27. When the discharged refrigerant temperature is below the predetermined temperature, thermal sensor 22 sends a close-control signal to electromagnetic valve 32, and electromagnetic valve 32 operates to close second conduit 27.

Figure 13:
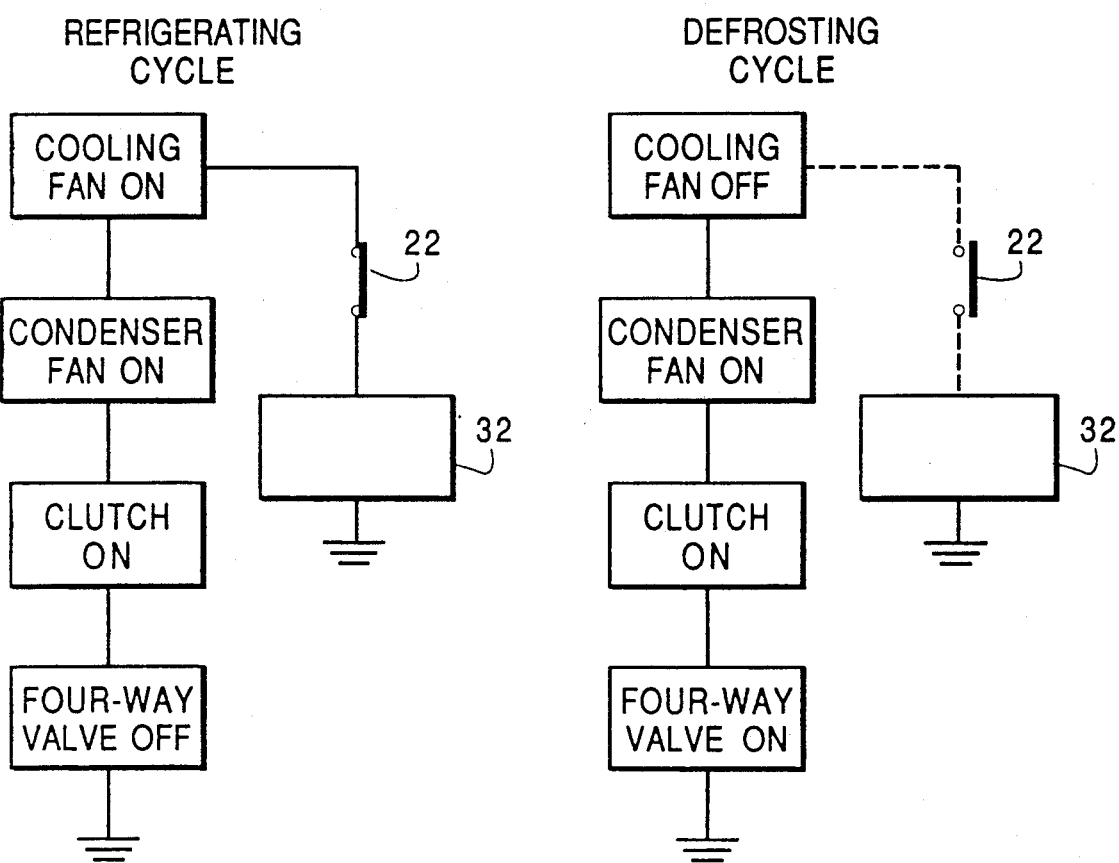
FIG. 13(a) is a state diagram illustrating operation of the FIG. 12 circuit diagram during the refrigerating cycle.
FIG. 13(b) is a state diagram illustrating operation of the FIG. 12 circuit diagram during the defrosting cycle.

The operation of the heat pump system according to the fifth embodiment of this invention is shown in FIG. 13. During the refrigerating cycle, thermal sensor 22 is operational when cooling fan 14 starts to operate. However, four-way valve 4 is not actuated at this time, i.e., it is in its normal refrigerating cycle position. Accordingly, only electromagnetic valve 32 operates to open or close second conduit 27. Further description of the operation of thermal sensor 22 and valve 32 is omitted since it is the same as described in the first embodiment.

On the other hand, during the defrosting cycle, thermal sensor 22 is not operational when cooling fan 14 is turned off. Electromagnetic valve 32 closes second conduit 32 and four-way valve 4 is actuated to the defrosting cycle position. During the defrosting cycle, refrigerant from second heat exchanger 6 flows into first heat exchanger 5 through first check valve 9, drain pipe 61, and second expansion valve 10. A part of the refrigerant also bypasses first heat exchanger 5 and flows into capillary tube 72. The volume of the refrigerant which bypasses first heat exchanger 5 changes in accordance with the pressure difference between the ends of first heat exchanger 5 which varies in accordance with the rotational speed of engine 2 and changes in ambient air temperature. Accordingly, a portion of the gas refrigerant at low temperature which passed through second heat exchanger 6 flows into inlet port 12 of compressor 1 through four-way valve 4 and the remaining portion flows through first heat exchanger 5 to inlet port 12. Therefore, the temperature of the refrigerant discharged from compressor 1 is gradually decreased and the temperature of the refrigerant discharged from compressor 1 can be controlled near the predetermined temperature.

The present invention has been described in detail in connection with the preferred embodiments, but these are for example only and this invention is not restricted thereto. It will be easily understood by those skilled in the art that variations and modifications can be easily made without departing from the scope of this invention.

I claim:

1. A heat pump refrigeration system for refrigerating a compartment comprising:
   a first heat exchanger mounted outside said compartment;
   a second heat exchanger mounted inside said compartment and coupled to said first heat exchanger;
   a compressor;
   a refrigerant conduit coupled between said first and second heat exchangers, and between said compressor and said first and second heat exchangers, to transport refrigerant;
   a valve mechanism coupled between said compressor and said first and second heat exchangers, said valve mechanism having two positions, one of which enables refrigerant to flow to said first and second heat exchangers in one direction and the other position enables refrigerant to flow in the opposite direction;
   cycle control means coupled to said valve mechanism for switching the position of said valve mechanism between a refrigerating cycle in which refrigerant flows from said first heat exchanger to said second heat exchanger and a defrosting cycle in which refrigerant flows in the opposite direction;
   a bypass conduit coupled to said second heat exchanger to pass at least a portion of the refrigerant around said second heat exchanger;
   temperature control means for measuring the temperature of the refrigerant discharged from said compressor during the refrigerating cycle and at least partially opening said bypass conduit when the temperature of the discharged refrigerant exceeds a predetermined temperature during the refrigerating cycle; and
   a fan adjacent said second heat exchanger, said fan coupled to said temperature control means for enabling said temperature control means to measure the temperature of the refrigerant discharged from said compressor as said fan is turned on and off.

2. The heat pump refrigeration system according to claim 1 further comprising a second bypass conduit coupled to said first heat exchanger to pass at least a portion of the refrigerant around said first heat exchanger.

3. The heat pump refrigeration system according to claim 2 wherein said second bypass conduit includes a check valve.

4. The heat pump refrigeration system according to claim 3 wherein said second bypass conduit further includes a capillary tube.

5. The heat pump refrigeration system according to claim 1 wherein substantially all the refrigerant passes through said bypass conduit during the refrigerating cycle when the temperature of the discharged refrigerant exceeds the predetermined temperature.

6. The heat pump refrigeration system according to claim 1 further comprising a continuously variable speed engine coupled to said compressor to drive said compressor.

7. The heat pump refrigeration system according to claim 6 wherein said continuously variable speed engine comprises a motor vehicle engine.

8. A heat pump refrigeration system for refrigerating a compartment comprising:
   a first heat exchanger mounted outside said compartment;
   a second heat exchanger mounted inside said compartment and coupled to said first heat exchanger;
   a compressor;
   a refrigerant conduit coupled between said first and second heat exchangers, and between said compressor and said first and second heat exchangers, to transport refrigerant;
   a valve mechanism coupled between said compressor and said first and second heat exchangers, said valve mechanism having two positions, one of which enables refrigerant to flow to said first and second heat exchangers in one direction and the other position enables refrigerant to flow in the opposite direction;
   cycle control means coupled to said valve mechanism for switching the position of said valve mechanism between a refrigerating cycle in which refrigerant flows from said first heat exchanger to said second heat exchanger and a defrosting cycle in which refrigerant flows in the opposite direction;
   a bypass conduit coupled to said second heat exchanger to pass at least a portion of the refrigerant around said second heat exchanger;
   first temperature control means for measuring the temperature of the refrigerant discharged from said compressor during the refrigerating cycle and at least partially opening said bypass conduit when the temperature of the discharged refrigerant exceeds a predetermined temperature during the refrigerating cycle; and
   refrigerant temperature control means adjacent said second heat exchanger and coupled to said first temperature control means for enabling said first temperature control means to measure the temperature of the refrigerant discharged from said compressor when said refrigerant temperature control means is activated.

9. The heat pump refrigeration system of claim 8 further comprising a second bypass conduit coupled to said first heat exchanger to pass at least a portion of the refrigerant around said first heat exchanger.

10. The heat pump refrigeration system of claim 9 wherein said second bypass conduit includes a check valve.

11. The heat pump refrigeration system of claim 10 wherein said second bypass conduit further includes a capillary tube.

12. The heat pump refrigeration system of claim 8 wherein substantially all the refrigerant passes through said bypass conduit during the refrigerating cycle when the temperature of the discharged refrigerant exceeds the predetermined temperature.

13. The heat pump refrigeration system of claim 8 further comprising a continuously variable speed engine coupled to said compressor to drive said compressor.

14. The heat pump refrigeration system of claim 13 wherein said continuously variable speed engine is a motor vehicle engine.

* * * * *

UNITED STATES PATENT AND TRADEMARK OFFICE
CERTIFICATE OF CORRECTION

PATENT NO. : 5,052,189

DATED : October 1, 1991

INVENTOR(S) : Shigeru Akiike

It is certified that error appears in the above-identified patent and that said Letters Patent is hereby corrected as shown below:

On the Title page, in section [56], please change:

"359,815" to --3,859,815--.

"Hasahara" to --Kasahara--.

"Egan" to --Egon--.

"Koocker" to --Kooiker--.

On the face of the patent, please change:

"Primary Examiner-William E. Tapoical" to --Primary Examiner-William E. Tapolcai--.

On the Title Page, in section [57], please change:

line 5, change "refrigertor" to --refrigerant--.

Column 4, line 26, change "bypass" to --bypasses--.

Signed and Sealed this

Twelfth Day of January, 1993

Attest:

DOUGLAS B. COMER

*Attesting Officer*  *Acting Commissioner of Patents and Trademarks*